(No Model.)
J. ROUST.
FILE HOLDER.
No. 519,738. Patented May 15, 1894.
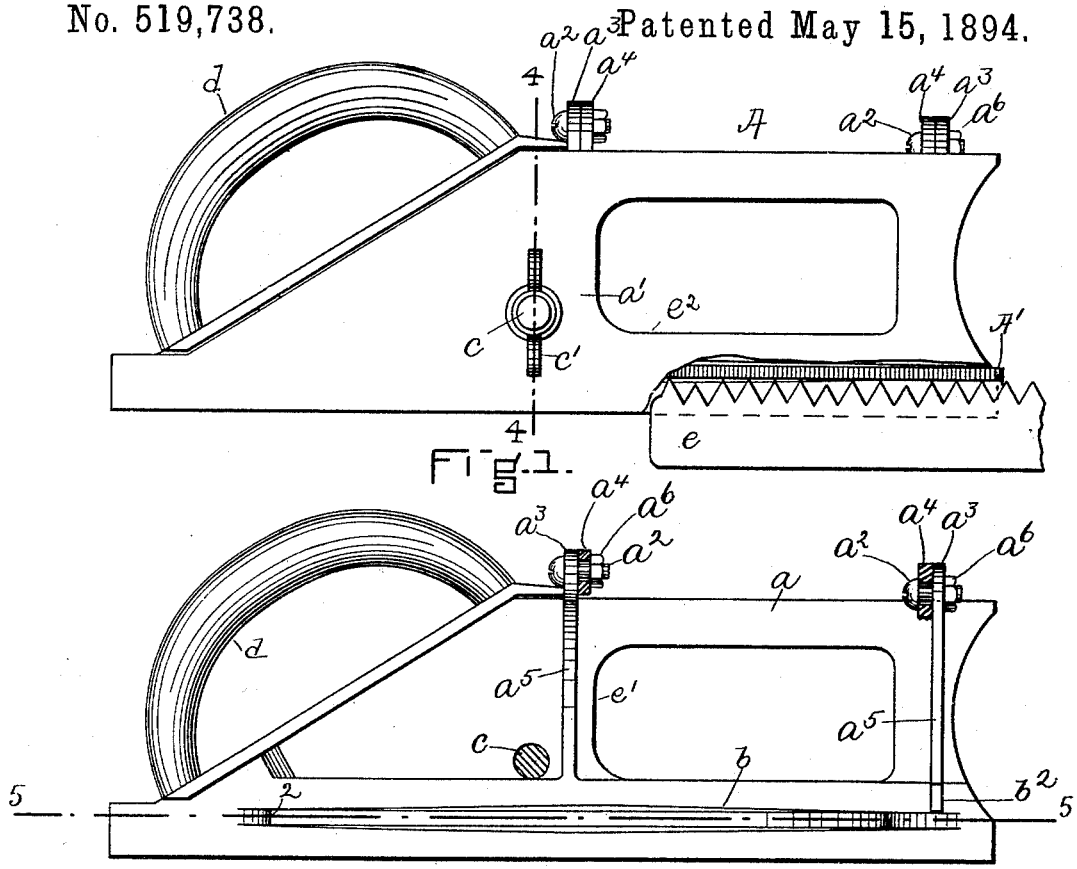
Fig. 1.
Fig. 2.
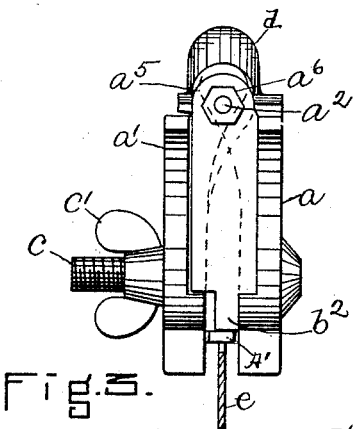
Fig. 3.
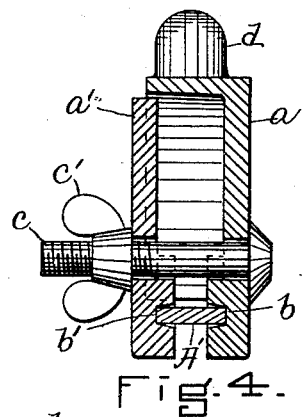
Fig. 4.
Fig. 5.
WITNESSES.
Matthew M. Blunt.
J. Murphy.
INVENTOR.
Joseph Roust
by Jas. H. Churchill
Atty.

UNITED STATES PATENT OFFICE.

JOSEPH ROUST, OF QUINCY, MASSACHUSETTS.

FILE-HOLDER.

SPECIFICATION forming part of Letters Patent No. 519,738, dated May 15, 1894.

Application filed January 23, 1894. Serial No. 497,834. (No model.)

*To all whom it may concern:*

Be it known that I, JOSEPH ROUST, of Quincy, in the county of Norfolk and State of Massachusetts, have invented an Improvement in File-Holders, of which the following description, in connection with the accompanying drawings, is a specification, like letters on the drawings representing like parts.

This invention relates to a tool for straightening saws, and is especially adapted for straightening the teeth of a saw, in case one or more of the said teeth become broken, prior to the teeth being recut to a uniform depth. In practice, it frequently happens that a number of teeth become broken either in whole or in part, and if these broken teeth should be re-sharpened, the broken teeth would be below the level of the good or unbroken teeth, and the saw would have a hollow, which would tend to make the saw jump or skip when in use, which results in ridges being made in the wood, and in nice work, as for instance in making a nice fit or a nice joint, these ridges are very objectionable, as they prevent the accomplishment of nice work. To straighten the teeth of saws having one or more broken teeth, the edges or points of the good teeth are filed off so as to bring them down on a level with the broken teeth, which is usually accomplished by a file in the hands of the operator, an extremely laborious and dangerous operation, as the file is grasped at its opposite ends between the fingers and thumb of each hand and moved over the teeth of the saw in the direction of the length of the same, the file being guided in its movement by the fingers and thumb bearing against the side of the saw, and it will readily be seen that if the file should slip, which it is liable to do, the fingers or thumbs are liable to become cut, frequently resulting in painful and even dangerous wounds.

It is the object of this invention to provide a frame or holder in which the file is firmly and securely clamped, and by means of which, the file may be operated with increased pressure, whereby the saw may be straightened in a substantially short time. The holder referred to, may and preferably will be made as two jaws provided with suitable ways, grooves or channels for the reception of the sides of the file, and in which the latter is securely held as will be described. These and other features of this invention will be pointed out in the claim at the end of this specification.

Figure 1, is a side elevation partially broken out of a tool embodying this invention, a portion of a saw blade being shown to more clearly illustrate the invention; Fig. 2, a side elevation of the tool shown in Fig. 1 with one of the jaws broken out; Fig. 3, a front end elevation looking to the left in Fig. 1; Fig. 4, a transverse section on the line 4—4, Fig. 1, and Fig. 5, a longitudinal section of the tool on the plane indicated by the line 5—5, Fig. 2, the file being shown in plan.

The tool comprises a holder A and a file A' secured therein. The holder A may and preferably will be made as herein shown, and consists of two members or jaws $a\ a'$ of iron or other suitable material and preferably pivotally secured together, which may be effected by pins or screws $a^2$, extended through suitable eyes or holes in lugs or ears $a^3\ a^4$ attached to the members or jaws $a\ a'$ respectively, the said lugs or ears in the present instance being shown as forming part of ribs $a^5$ attached to or forming part of the inner sides of the said jaws. The screws or pivots $a^2$ may be secured in place by nuts $a^6$. Each jaw or member $a\ a'$ is preferably thickened at its bottom or lower end, and on the inner surface, the jaws or members $a\ a'$ are provided with longitudinal ways, grooves or channels $b\ b'$, which, for the best results, are made deeper at the rear end of the jaws, to form shoulders 2, 3 (see Fig. 5) for a purpose as will be described, the front portion of the said channels being preferably made tapering or gradually shallow as best shown in Fig. 5, to conform to the taper of files now commonly made. The shoulders 2, 3, act as stops and prevent the rearward movement of the file while in operation, and the taper form of the grooves or channels $b\ b'$ prevent the forward movement of the file, and to prevent any upward movement of the tapered end of the file not extended into the channels $b\ b'$, one of the jaws as $a$ may be provided with a stop, shown as a projection or nose $b^2$, (see Figs. 2 and 3) on the rib $a^5$ nearest the front end of the jaw $a$. The file A' may be firmly secured to its holder A by a lock for the jaws or members $a\ a'$, which lock is shown as a threaded bolt c extended through suitable holes in the said jaws and a thumb nut c', and when in this position, the tool is ready for use.

In the present embodiment of this invention, the tool is provided with a handle d shown as secured to or forming part of the member or jaw a', and by which the tool may be operated by hand, but if desired, it may be adapted to be operated by power. The channels or grooves b b' are preferably made a substantially little distance above the bottom of the members or jaws, so that when the tool is in operative condition, the portion of the jaws below the file, forms a guideway for the saw e. The jaws or members a a' may be provided with substantially large openings e' e² to reduce the weight of the holder.

In the operation of my improved tool, the file A' may be moved over the teeth of the saw e in the direction of the length of the same, by the operator reciprocating the holder A, the saw at such time being supposed to be firmly held as in a vise, and by reason of the file being firmly and securely held, substantially great pressure may be exerted, whereby the teeth of the saw may be straightened or brought to substantially the same level in a substantially short time.

The tapering channels or grooves b b' permit the holder to be used with files of varying lengths, and the said grooves or channels may be made of any suitable shape in cross-section to accommodate any suitable shape of file, as for instance, a round, three-cornered or other form of file. It will be seen that the file when in operative position, is positively locked against movement independent of the holder. The tool permits the teeth of the saw to be straightened in a substantially short time, and if desired, all the teeth may be filed off until a straight edge is formed in the saw, after which new teeth may be cut. I prefer to provide each jaw or member with a way, channel or groove having its walls continuous, but I do not desire to limit my invention in this respect, as it is evident that the jaw may be provided with a series of lugs or projections forming a non-continuous channel groove or way for the reception of the side of the file. In this case, the ways, channels or grooves formed on each jaw might serve the same purpose as the continuous way, channel or groove.

I claim—

A file holder consisting of two jaws or members provided with longitudinal ways, grooves or channels of substantially the length of the file and into which the sides of the file project and are firmly supported against vertical movement, the said channels being made deeper at their rear portions to form shoulders 2, 3, and tapering at their front end, a front stop or projection on one of said jaws to co-operate with the end of the file unsupported by or projecting beyond the tapering end of the said ways or channels, and means to lock the said jaws or members, substantially as described.

In testimony whereof I have signed my name to this specification in the presence of two subscribing witnesses.

JOSEPH × ROUST.
his mark

Witnesses:
JAS. H. CHURCHILL,
J. MURPHY.